United States Patent [19]

Stolarczyk

[11] Patent Number: 5,146,611
[45] Date of Patent: Sep. 8, 1992

[54] MINE COMMUNICATION CABLE AND METHOD FOR USE

[75] Inventor: Larry G. Stolarczyk, Raton, N. Mex.

[73] Assignee: Stolar, Inc., Raton, N. Mex.

[21] Appl. No.: 121,524

[22] Filed: Nov. 17, 1987

[51] Int. Cl.⁵ .............................................. H04B 13/02
[52] U.S. Cl. ......................................... 455/40; 174/28
[58] Field of Search ............................... 455/40, 14–16, 455/41; 340/347 R, 347 AD, 565; 367/81, 93; 174/28

[56] References Cited

U.S. PATENT DOCUMENTS

| | | | |
|---|---|---|---|
| 4,010,619 | 3/1977 | Hightower et al. | 174/28 |
| 4,679,600 | 7/1987 | Dougherty | 138/178 |
| 4,777,652 | 10/1988 | Stolarczyk | 455/41 |

Primary Examiner—Curtis Kuntz
Attorney, Agent, or Firm—Thomas E. Schatzel

[57] ABSTRACT

A mine emergency communication cable and a method for use. The cable is comprised of a plurality of brightly colored, lightweight, strong synthetic fibers having a plurality of noninsulated tin plated copper wires and stainless steel wires at least one insulated copper wire interwoven with the synthetic fibers. At least two transceivers are inductively coupled to the cable creating a radio communication link. The noninsulated wires allow pieces of the cable to be connected by tying a knot in the cable. The insulated wire increases the communication distance by supporting the bifilar radio communication mode. The cable can also function as a physical guide which miners can follow to a safe location during a mine emergency.

32 Claims, 2 Drawing Sheets

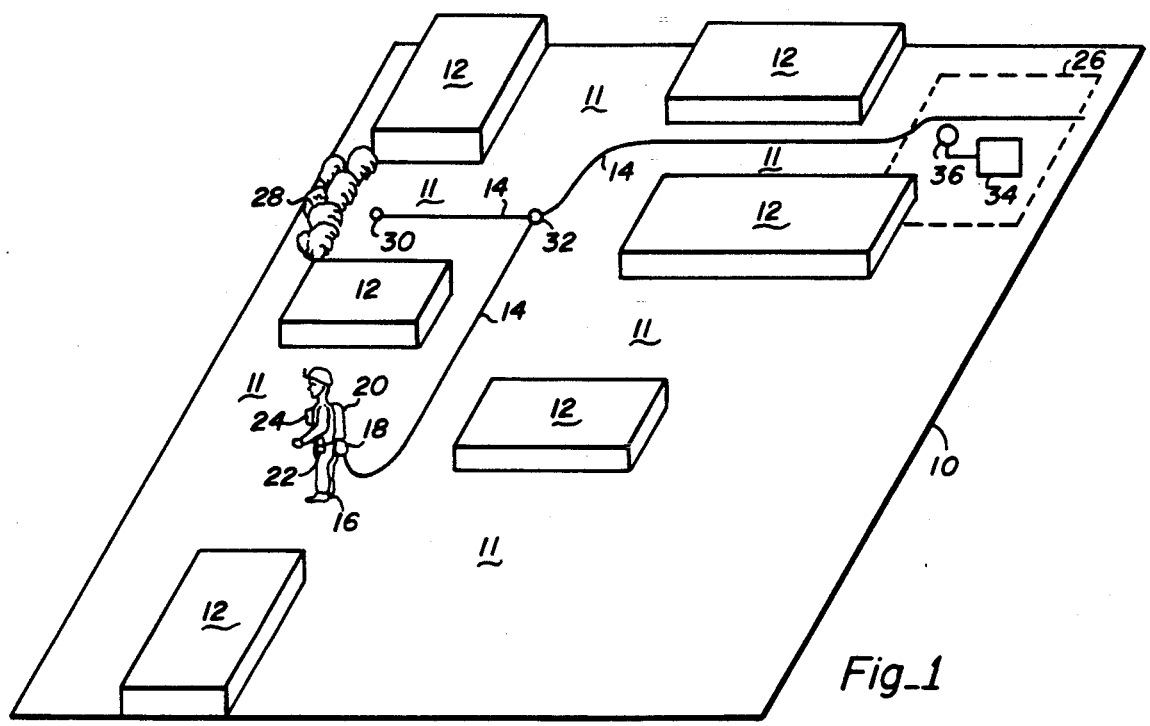
*Fig_1*
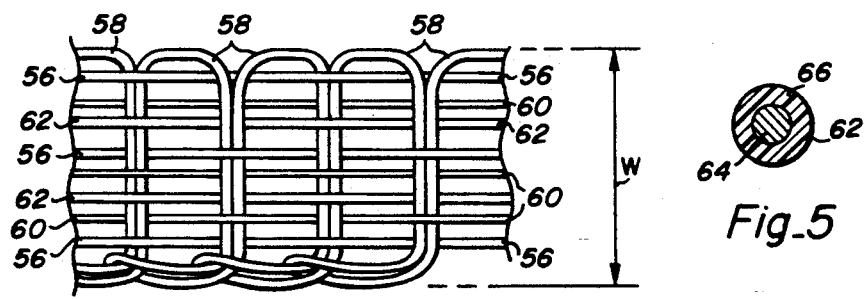
*Fig_4*  *Fig_5*
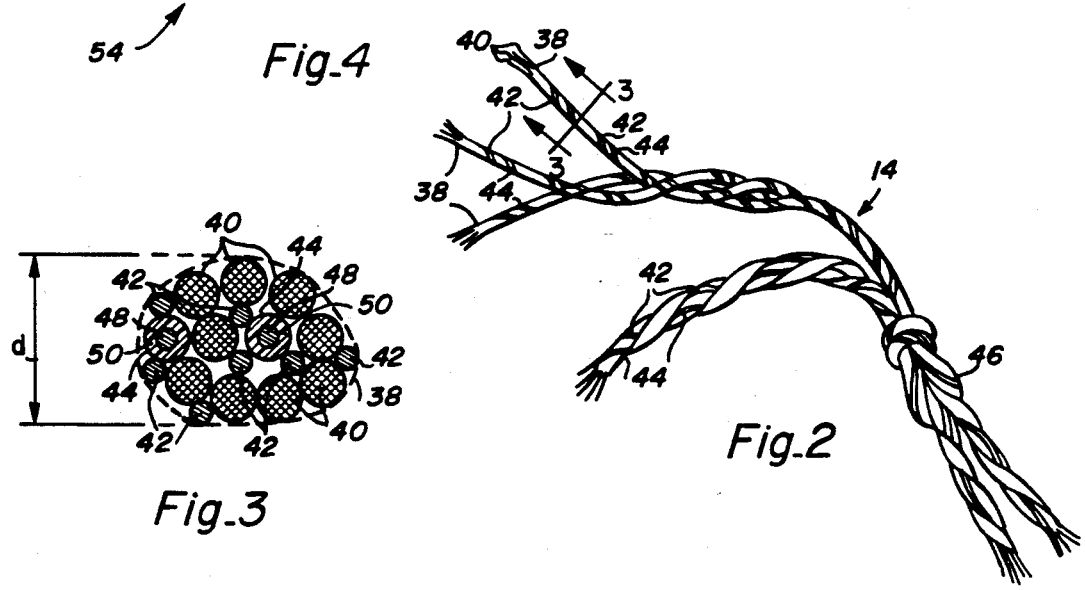
*Fig_3*  *Fig_2*

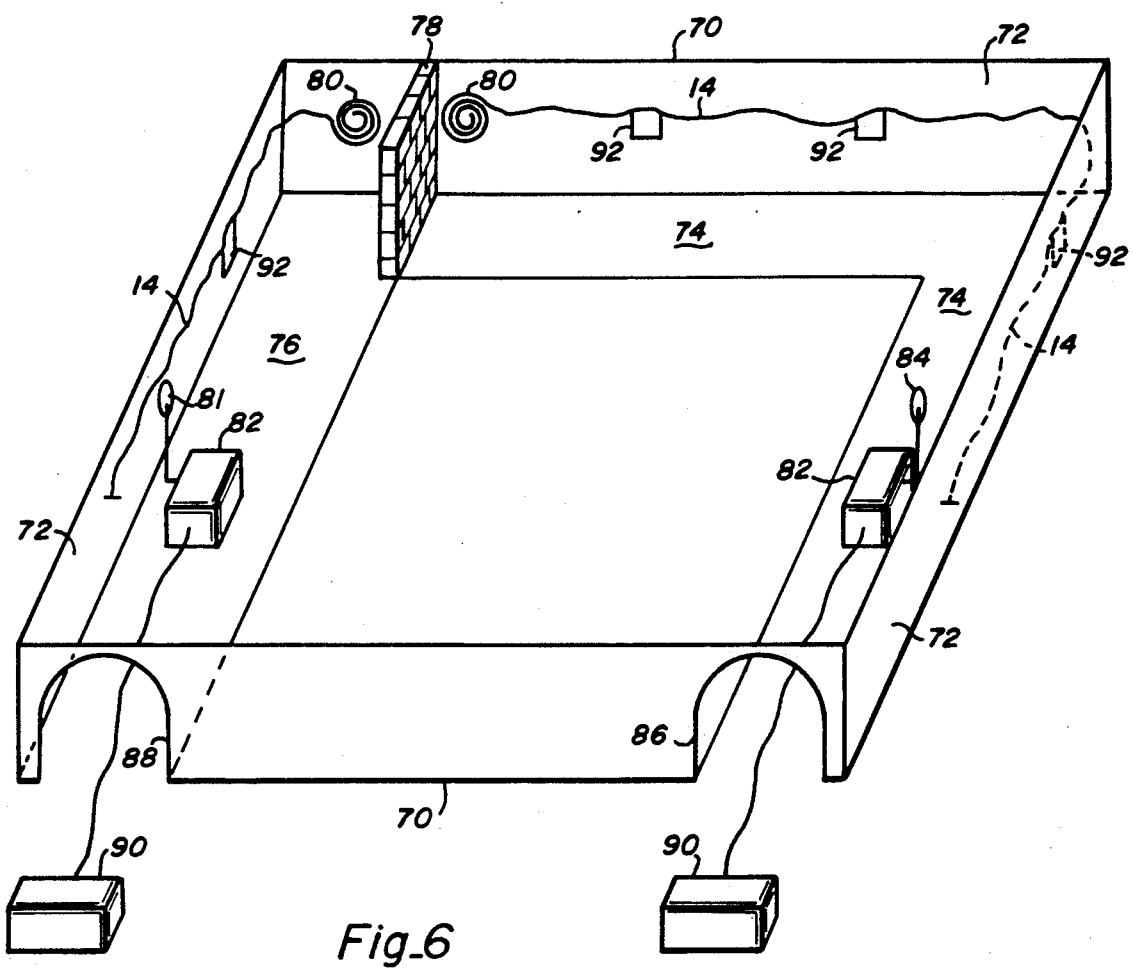
Fig_6

MINE COMMUNICATION CABLE AND METHOD FOR USE

BACKGROUND OF THE INVENTION

1. Field of the Invention

The present invention relates generally to a mine emergency communication cable and method for use and more particularly to a cable made of a lightweight rope having a plurality of noninsulated electrically conducting wires intertwined in the rope. One or more insulated electrically conducting wires can be intertwined in the rope.

2. Description of the Prior Art

Current techniques for effecting the rescue of miners trapped or injured underground involve sending a rescue team from a surface location or some other safe area to aid the trapped or injured miners. Frequently, the members of the rescue team pull a heavy two core insulated cable into the mine. This heavy cable connects the rescue team, via a sound powered microphone, to a fresh air base. Pulling this cable into the mine expends a considerable amount of the rescue team's energy. Additionally, if the rescue team encounters an obstruction in the mine, the heavy cable must be reeled in while the rescue team backtracks in order to prevent entanglement or snagging of the heavy cable.

Gallagher Electronics, Ltd., a New Zealand Corporation, has developed and marketed a lightweight rope comprised of synthetic fibers which includes a plurality of noninsulated stainless steel and copper conducting wires intertwined with the synthetic fibers. This lightweight rope is used as an electric fence for restraining cattle or sheep. A similar product containing aluminum wire is manufactured and in use in Canada. To the inventor's knowledge, neither of these products have been used in communication applications.

A medium frequency radio communication system which utilized transceivers coupled to the existing mine wiring network was described by L. G. Stolarczyk and R. L. Chufo in a paper entitled *System Design and Performance of an MF Radio Communication System For Underground Mining,* (September 1981). As discussed in that paper, early theoretical work by D. A. Hill and J. R. Wait in *Excitation of Monofilar and Bifilar Modes on a Transmission Line in a Circular Tunnel,* Journal of Applied Physics, Vol. 45, No. 8 (August 1974), described the existence of low loss signal propagation modes that exist in underground tunnels containing conductors.

SUMMARY OF THE PRESENT INVENTION

It is therefore an object of the present invention to provide a cable that can be used for mine emergency communication purposes that is lightweight.

It is another object of the present invention to provide a mine emergency communication cable that can be severed and reconnected when obstacles are encountered during rescue.

It is another object of the present invention to provide a cable that can be used for mine emergency communication purposes over long distances.

It is another object of the present invention to provide a method for establishing a permanent mine emergency communication system.

Briefly, a preferred embodiment of the emergency cable includes a rope comprised of a lightweight material, which is usually a synthetic fiber such as polyethylene, Kevlar or nylon. A plurality of small diameter noninsulated conducting wires are intertwined with the synthetic fibers. At least one insulated conducting wire can also be intertwined with the synthetic fibers in order to enhance long distance transmission. At least two transceivers are inductively coupled to the cable, usually by means of a magnetic dipole "tuned loop" antenna connected to each of the transceivers.

The emergency cable may be laid by a rescue team as the team traverses a mine passageway and can be dispensed from an apparatus attached to a member of the rescue team. Alternatively, the cable can be laid in the mine before the emergency arises. At least one transceiver is coupled to the cable at a fresh air base and members of the rescue team carry at least one transceiver thus establishing a communication link to the fresh air base.

If physical obstacles, such as rock falls, are encountered while effecting a rescue, the cable can be cut and reconnected at a different point simply by tying a knot in the pieces to be connected.

An advantage of the present invention is that the emergency cable is lightweight and readily transportable.

Another advantage of the present invention is that the emergency cable can be severed and reconnected, physically and electrically, without the need for electrical plugs and sockets.

Another advantage of the present invention is that underground communication is possible over long distances.

Another advantage of the present invention is that the emergency cable can be permanently installed in a mine.

Yet another advantage of the present invention is that physical devices can be attached to the cable to indicate escapeways out of the mine.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is a diagrammatic illustration of an emergency communication cable in use in an underground mine;

FIG. 2 illustrates a section of a preferred embodiment of an emergency communication cable of the present invention;

FIG. 3 is a cross-sectional view of a strand of the emergency communication cable of FIG. 2 taken along the line 3—3;

FIG. 4 illustrates a length of an alternative embodiment of an emergency communication cable of the present invention;

FIG. 5 is a cross-sectional view of an insulated wire of FIG. 4; and

FIG. 6 is a diagrammatic illustration of an emergency communication cable permanently installed in an underground mine.

DETAILED DESCRIPTION OF THE PREFERRED EMBODIMENT

Referring to FIG. 1, it illustrates an underground mine 10 containing a plurality of passageways 11 bounded by a plurality of mineral deposits 12, e.g. coal, rock or other similar materials. A mine emergency communication cable 14 has been laid by a rescue team member 16. The cable 14 is being dispensed from a dispensing means 18 worn by the rescue team member 16. Team member 16 is also wearing a self-contained breathing apparatus 20 and a personal carried transceiver 22 which is connected to an antenna 24.

The cable 14 has been laid from a fresh air base 26 along one of the passageways 11 until an obstacle 28, such as a rock fall, was encountered. The cable 14 was cut at a point 30 and reconnected by a reconnection means 32.

The dispensing means 18 can be any apparatus such as a rotatable spool, that is suitable for dispensing a trail of rope such as cable 14. The transceiver 22 is preferably a small medium frequency (MF) transceiver capable of transmitting and receiving radio signals in the 300-800 KHz frequency range. The transceiver 22 could also be a low frequency transceiver capable of transmitting and receiving radio signals in the 80-300 KHz frequency range. The antenna 24 is preferably a vertical tuned loop magnetic dipole antenna that can be attached to an article of clothing worn by the rescue member 16. For example, antenna 24 could be a rectangular loop of wire attached to a pair of suspenders worn by rescue member 16.

The fresh air base 26 can be at a point in mine 10 or outside of mine 10 from which the rescue operation was initiated. The base station transceiver 34 is preferably a medium frequency transceiver capable of transmitting and receiving radio signals in the 300-800 KHz frequency range, but could also be a low frequency transceiver. The antenna 36 is preferably a tuned loop magnetic dipole antenna, known in the art, made from an approximately 1.5 inch wide strip of 0.25 inch thick flexible plastic material, e.g. polycarbonate (Lexan), and fashioned into a circular loop. The loop is then wound with seven turns of multiple core litz wire in a groove provided in the plastic material. After winding, the exposed multiple core wire is covered with a thin strip of the plastic material.

The reconnection means 32 could be any means for connecting two or more pieces of cable 14 together. However, a very convenient method of accomplishing this task would be to tie a common knot, such as a square knot, in the pieces of cable 14.

In the preferred embodiment, cable 14 has the cylindrical rope-like configuration shown in FIG. 2. A plurality of strands 38, comprised of a plurality of fibers 40, are woven together to form the cable 14. The fibers 40 are comprised of physically strong, lightweight materials such as nylon, polyurethane, polyester or Kevlar. A plurality of one or more types of noninsulated, electrically conducting, small diameter wires 42 are intertwined with the fibers 40. One or more insulated, electrically conducting wires 44 can be included in the cable 14. The wires 42 and 44 extend continuously over the length of cable 14. A knot 46 is shown connecting two pieces of the cable 14. As was previously mentioned, the knot 46 can function as the reconnection means 32 shown in FIG. 1.

The cable 14 is manufactured so as to be highly visible in the mine environment. For example, in the preferred embodiment, the fibers 40 are dyed yellow, red or some other bright color so as to contrast with the mine floor when illuminated by a light. Alternatively, reflective or fluorescent material could be added to the fibers 40.

FIG. 3 shows a cross-sectional view of a strand 38 taken along the line 3—3 of FIG. 2. There it can be seen that the insulated wires 44 are comprised of a small diameter wire 48 surrounded by an electrical insulating layer 50. In the preferred embodiment, the wire 48 is comprised of copper and the noninsulated wires 42 are comprised of two types of wire. Some of the wires 42 are comprised of stainless steel and some of the wires 42 are comprised of tin plated copper. The wires 42 and 48 have diameters in the range of 0.05 to 3.0 millimeters. Other electrical conducting metals could be used for comprising the wires 42 and 48. Each of the strands 38 have a diameter "d" of approximately 0.10 cm to 0.20 cm giving the cable 14 a diameter of approximately 0.30 cm to 0.60 cm in the preferred embodiment.

FIG. 4 shows a cable 44, having a flat configuration, which is an alternative embodiment of the cable 14. In cable 54, a first plurality of fibers 56 are interwoven with a second plurality of fibers 58 such that the fibers 58 are perpendicular to the fibers 56 over part of their length. A plurality of noninsulated small diameter, electrically conducting metal wires 60 extend continuously over the length of cable 54, running parallel to the fibers 56 and being interwoven with the fibers 56 and 58. One or more insulated wires 62 can be included in cable 54. The wires 62 extend continuously over the length of cable 54 in parallel to the fibers 56 and wires 60 and are interwoven with fibers 56 and 58. The flat configuration of cable 54 has a width "w" of approximately 1.2 cm.

FIG. 5 illustrate a cross-sectional view of one of the insulated wires 62. A small diameter electrically conducting metal wire 64 is surrounded by an electrically insulating layer 66.

The wires 60 and 62 of cable 54 are analogous to the wires 42 and 44, respectively, of cable 14 (shown in FIG. 2). Thus, the dimensions and compositions of the wires 60 and 62 may be the same as those of wires 42 and 44, respectively. Additionally, the same composition and color requirements applicable to cable 14 apply to cable 54. As previously mentioned, one source for the cable 14 and 54, without the insulated wires 44 and 62, respectively, are those manufactured by Gallagher Electronic, Ltd., of Hamilton, New Zealand.

FIG. 6 illustrates a mine 70 in which the mine emergency communication cable 14 has been attached to a plurality of walls 72 at a height that is in easy reach of a miner trying to exit the mine 70. The cable 14 is hung such that a large loop is formed by cable 14 hanging on the walls 72.

The walls 72 abut an entry passageway 74 and a return passageway 76. United States mine law requires that a break, such as a brick restraining wall 78, exist at the point where the entry passageway 74 meets the return passageway 76. Thus, the cable 14 must be physically severed at the wall 78 and the two ends of cable 14 adjacent to the wall 78 are fashioned into a pair of coils 80.

A pair of base station transceivers 82 are coupled to the cable 14 by a pair of antennas 84. The transceivers 82 and antennas 84 can have the same specifications as the base station transceiver 34 and antenna 36, respectively, shown in FIG. 1. One of the transceivers 82 is positioned near the entry 86 of the entry passageway 74 and the other transceiver 82 is positioned near the entry 88 of the return passageway 76. A pair of remote audio units 90, located outside of mine 70, can be electrically connected to the transceiver 82.

A plurality of physical indicating devices 92 can be attached to the cable 14. The devices 92 would physically indicate information (in the form of numbers, letters or other symbols) concerning escape routes from mine 70. Such information could be the distance to the surface or the direction or location of alternative escape routes or air doors.

The functioning of the mine emergency communication cable 14 shown in FIG. 1, is as follows. During mine rescue, the cable 14 may be strung from the fresh air base 26 by the rescue team member 16 as the rescue operation proceeds. Magnetic dipole antennas, such as antennas 24 and 36, are inductively coupled to cable 14 and excite strong monofilar current flow in nearby electrical conductors such as the noninsulated wires 42 and insulated wires 44 (shown in FIG. 2). Thus, cable 14 functions as a transmission line permitting radio communications to be established between the transceivers 22 and 34.

If the cable 14 breaks or is cut, such as at point 30 in FIG. 1, the noninsulated wires 42 allow the cable 14 to be quickly repaired by attaching two ends of cable 14 together in a manner that brings the wires 42 in the two ends into proximity with each other permitting inductive coupling. For example, the knot 46 could be tied in cable 14 as reconnection means 32 in FIG. 1. The wires 42 that are comprised of stainless steel facilitate inductive coupling while the wires 42 that are comprised of tin plated copper facilitate signal propagation. The wires 42 are preferentially made of a nonreactive conducting metal, e.g. stainless steel, or combination of metals, e.g. tin plated copper, in order to withstand the highly chemically reactive mine environment.

The current flow induced in the wires 42 and 44 flows in the same direction in each electrical conductor in the cable 14 (monofilar mode). The return current flows through the poorly conducting surrounding rock of mine 10 where signal energy loss is high. Thus, the distance over which radio communication is possible, is limited.

Wire conductors having return current flow capability support a low loss bifilar mode of radio signal propagation. This would increase the distance over which radio communication is possible. The conversion from a monofilar to a bifilar signal propagation mode can occur in the wires 42 and 44 where changes in the characteristic impedance of the wires occurs. Such an impedance change occurs, for example, where the spacing between the wires 42 and 44 changes. Changes in the characteristic impedance give rise to reflections that cause part of the wave energy to be returned and propagate backwards along the cable. This gives rise to the formation of the bifilar signal propagation mode.

The insulated wires 44 support the bifilar propagation mode more effectively than the noninsulated wires 42. Thus, the presence of the insulated wires 44 in cable 14 facilitates radio communication at distances greater than about 2000 feet.

If the mine emergency communication cable is made in the form of the flat ribbon cable 54 shown in FIG. 4, both the noninsulated wires 60 and the insulated wires 62 support the bifilar mode at short distances. However, if the mine emergency communication cable is of the cylindrical rope configuration, such as cable 4 shown in FIG. 2, it is possible that some of the noninsulated wires 42 will be shorted together over some length of the cable, thus preventing bifilar propagation over that length. By including the insulated wire 44 in cable 14, existence of the bifilar propagation mode is ensured. The insulated wire 62 is present in the flat ribbon cable 54 to provide a redundant mode for bifilar propagation.

FIG. 6 illustrates another application of the cable 14. Typically, coal mines have entries, such as return passageway 76, which are designated as escape routes. The cable 14 would be permanently hung in passageways 76 and 74 at an accessible height so as to enable a miner to use the cable as a "life line". In the event that passageways 76 and 74 were filled with smoke, the miner could feel his way out of the mine. At convenient intervals, physical indicating devices 92 would be attached to cable 14 to indicate information such as the direction out of mine 70 or the location of self-contained breathing units or alternative escape routes.

Miners wearing a personal carried transceiver 22 and antenna 24 (shown in FIG. 1) could communicate over the cable 14 of FIG. 6 with the transceivers 82. The audio units 90 would allow personnel outside mine 70 to monitor communications. The cable 14 would be installed in a large loop so that a break in cable 14 would not completely disrupt the communication capability of cable 14. The coils 80, which exist on either side of wall 78, permit inductive signal coupling to occur despite the break caused by wall 78.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A mine communication cable comprising:
    a length of rope that can be carried into a mine by a single human being miner comprised of a plurality of flexible strands of a physically strong, lightweight material;
    a plurality of flexible, noninsulated electrically conductive wires interwoven with said strands of strong lightweight material, the noninsulated wires being continuous over the length of rope; and
    at least one insulated electrically conductive flexible wire interwoven with said strands of strong lightweight material, the insulated wire being continuous over the length of rope for transmitting electrical communication signals.
2. The mine communication cable of claim 1 wherein, the physically strong lightweight material comprises a synthetic material.
3. The mine communication cable of claim 2 wherein, said synthetic material comprises nylon.
4. The mine communication cable of claim 2 wherein, said synthetic material comprises Kevlar material.
5. The mine communication cable of claim 2 wherein, said synthetic material comprises polyethylene.
6. The mine communication cable of claim 1 wherein, the noninsulated wires comprise stainless steel.
7. The mine communication cable of claim 1 wherein, the noninsulated wires comprise tin plated copper.
8. The mine communication cable of claim 1 wherein, the noninsulated wires comprise at least one stainless steel wire and at least one tin plated copper wire.
9. The mine communication cable of claim 1 wherein, the insulated wire comprises copper.

10. The mine communication cable of claim 1 wherein,
the rope is colored a highly visible color.

11. The mine communication cable of claim 1 wherein,
the flexible, noninsulated electrically conductive wires provide a means for establishing current flow between a first piece of the mine communication cable and a second piece of the mine communication cable that have been connected together by tying a knot that brings the flexible, noninsulated electrically conductive wires in said first piece into proximity with the flexible, noninsulated electrically conductive wires in a said second piece.

12. A mine communication system comprising:
a lightweight rope that can be carried into a mine by a single human being miner and extended along a mine passageway, the lightweight rope comprising a plurality of flexible, noninsulated electrically conductive wires interwoven with a plurality of strands of a flexible, strong, lightweight material, said noninsulated wires being continuous over the length of the rope for transmitting electrical communication signals;
a first transceiver inductively coupled to the lightweight rope at a first location; and
a second transceiver inductively coupled to the lightweight rope at a second location, whereby a radio communication pathway is established between the first and second transceivers over the lightweight rope.

13. The mine communication system of claim 12 further comprising:
at least two antennas for coupling the transceivers to the lightweight rope.

14. The mine communication system of claim 12 further comprising:
at least one insulated electrically conductive wire interwoven into the rope, the insulated wire being continuous over the length of the rope.

15. The mine communication system of claim 12 wherein,
the first and second transceivers are medium frequency transceivers.

16. The mine communication system of claim 12 wherein,
the first and second transceivers are low frequency transceivers.

17. The mine communication system of claim 12 wherein,
the rope comprises a plurality of strands of a synthetic material.

18. The mine communication system of claim 12 wherein,
the noninsulated metal wires comprise tin plated copper.

19. The mine communication system of claim 12 wherein,
the noninsulated wires comprise stainless steel.

20. The mine communication system of claim 12 wherein,
the noninsulated wires comprise at least one stainless steel wire and at least one tin plated copper wire.

21. The mine communication system of claim 12 wherein,
the rope is colored a highly visible color.

22. The mine communication system of claim 12 further comprising:
a magnetic dipole antenna electrically connected to the first transceiver for coupling the first transceiver to the lightweight rope.

23. The mine communication system of claim 22 wherein,
the magnetic dipole antenna comprises a first strip of polycarbonate material fashioned into a loop with a plurality of turns of multiple core litz wire wound around said loop, and a second strip of polycarbonate material covering said multiple core litz wire.

24. The mine communication system of claim 14 wherein,
at least one insulated wire comprises copper.

25. A mine communication system comprising:
a portable lightweight rope that can be carried into a mine by a single human being miner and extended along a mine passageway, and comprising a plurality of flexible, noninsulated tin plated copper wires extending continuously over the length of the rope and interwoven with a plurality of strands of a flexible, strong, lightweight synthetic material;
at least one insulated stainless steel wire extending continuously over the length of the rope;
a first transceiver inductively coupled to the lightweight rope at a first location by a first magnetic dipole antenna; and
a second transceiver inductively coupled to the lightweight rope at a second location by a second magnetic dipole antenna, whereby a radio communication pathway is established between the first and second transceivers over the lightweight rope.

26. A method for underground communication between a rescuer and a fresh air base, comprising:
preparing a length of lightweight rope having a plurality of flexible, noninsulated, small diameter, electrically conductive wires interwoven with a lightweight synthetic flexible material for dispensing by a manually carried or carted assembly dispensing means;
dispensing said rope from said dispensing means from a fresh air base location and extending said rope into an underground mine to near a first rescue team member;
coupling a first transceiver to said rope near said first rescue team member; and
coupling a second transceiver to said rope in said fresh air base, whereby communication is established between said first transceiver within said underground mine and said second transceiver positioned at said fresh air base.

27. The method of claim 26, further comprising:
cutting said rope, when an underground mine passageway obstacle is encountered by a rescuer, into a first length and a second length; and
connecting said second length of said rope to a point on said first length of lightweight rope.

28. The method of claim 27, wherein:
said connection is made by tying said second length of rope to said first length of rope with a knot.

29. The method of claim 26, further comprising:
linking both a monofilar and a bifilar mode radio signal communication with said rope.

30. A method of communicating in a mine, comprising:
installing a length of lightweight rope along the roof of a mine passageway, before a mine emergency arise, at an accessible height to allow the rope to be used as a lifeline, said rope having a plurality of flexible, noninsulated, small diameter, electrically conductive wires intertwined with a plurality of synthetic fibers extending the length of the rope;

coupling a first transceiver to said rope near a first miner; and coupling a second transceiver to said rope near a second miner whereby communication is established between said first miner and said second miner during a mine emergency.

31. The method of claim 30, further including:

placing a plurality of means for indicating escape information along said rope whereby alternate escape routes and the location of breathing apparatus is communicated to a miner.

32. The method of claim 30, further including:

separating said rope into a first loose end and a second loose end;

coiling said first loose end into a first coil;

coiling said second loose end into a second coil; and placing said first coil in proximity with said second coil whereby radio signal coupling between said coils is established.

* * * * *